US011963186B2

(12) United States Patent
Huang et al.

(10) Patent No.: US 11,963,186 B2
(45) Date of Patent: Apr. 16, 2024

(54) DYNAMIC REPETITION AND FREQUENCY HOPPING FACTORS FOR PHYSICAL UPLINK CONTROL CHANNEL

(71) Applicant: QUALCOMM Incorporated, San Diego, CA (US)

(72) Inventors: Yi Huang, San Diego, CA (US); Wanshi Chen, San Diego, CA (US); Tingfang Ji, San Diego, CA (US); Hwan Joon Kwon, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/443,189

(22) Filed: Jul. 22, 2021

(65) Prior Publication Data

US 2022/0046692 A1 Feb. 10, 2022

Related U.S. Application Data

(60) Provisional application No. 62/706,282, filed on Aug. 7, 2020.

(51) Int. Cl.
*H04W 72/23* (2023.01)
*H04L 1/1812* (2023.01)
*H04W 72/1273* (2023.01)
*H04W 72/566* (2023.01)

(52) U.S. Cl.
CPC ........... *H04W 72/23* (2023.01); *H04L 1/1812* (2013.01); *H04W 72/1273* (2013.01); *H04W 72/569* (2023.01)

(58) Field of Classification Search
CPC ............... H04W 72/23; H04W 72/569; H04W 72/1273; H04L 1/1812
See application file for complete search history.

(56) References Cited

U.S. PATENT DOCUMENTS

| 11,290,215 | B2* | 3/2022 | Tirronen | H04L 1/1887 |
| 2019/0261361 | A1* | 8/2019 | Xiong | H04W 72/02 |
| 2020/0221448 | A1* | 7/2020 | Park | H04L 1/1896 |
| 2020/0296701 | A1* | 9/2020 | Park | H04W 72/56 |
| 2021/0360610 | A1* | 11/2021 | Kim | H04W 72/02 |
| 2022/0030443 | A1* | 1/2022 | Chen | H04W 72/21 |
| 2022/0052797 | A1* | 2/2022 | Yu | H04L 1/1822 |
| 2022/0086032 | A1* | 3/2022 | Park | H04W 72/21 |
| 2022/0191839 | A1* | 6/2022 | Ying | H04L 5/0091 |

(Continued)

*Primary Examiner* — Christopher M Crutchfield
*Assistant Examiner* — Tito Q Pham
(74) *Attorney, Agent, or Firm* — Harrity & Harrity LLP/Qualcomm Incorporated

(57) ABSTRACT

Various aspects of the present disclosure generally relate to wireless communication. In some aspects, a base station may transmit, and a user equipment (UE) may receive, downlink control information (DCI) scheduling a physical downlink shared channel (PDSCH) and indicating a physical uplink control channel (PUCCH) repetition factor. The UE may transmit, and the base station may receive, a PUCCH that includes hybrid automatic repeat request acknowledgement feedback associated with the PDSCH. In some aspects, one or more instances of the PUCCH are transmitted across one or more uplink slots or sub-slots based at least in part on the PUCCH repetition factor indicated in the DCI. Numerous other aspects are provided.

30 Claims, 8 Drawing Sheets

(56) References Cited

U.S. PATENT DOCUMENTS

| | | | | |
|---|---|---|---|---|
| 2022/0271880 A1* | 8/2022 | Choi | ...................... | H04L 5/0094 |
| 2022/0369297 A1* | 11/2022 | Takahashi | ............. | H04L 5/0048 |
| 2023/0045971 A1* | 2/2023 | Kim | ......................... | H04L 1/08 |
| 2023/0058265 A1* | 2/2023 | Yao | ....................... | H04L 5/0048 |

* cited by examiner

DYNAMIC REPETITION AND FREQUENCY HOPPING FACTORS FOR PHYSICAL UPLINK CONTROL CHANNEL

CROSS-REFERENCE TO RELATED APPLICATION

This Patent application claims priority to U.S. Provisional Patent Application No. 62/706,282, filed on Aug. 7, 2020, entitled "DYNAMIC REPETITION AND FREQUENCY HOPPING FACTORS FOR PHYSICAL UPLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic repetition and frequency hopping factors for a physical uplink control channel (PUCCH).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: receiving, from a base station, downlink control information (DCI) scheduling a physical downlink shared channel (PDSCH) and indicating a physical uplink control channel (PUCCH) repetition factor; and transmitting, to the base station, a PUCCH that includes hybrid automatic repeat request acknowledgement (HARQ-ACK) feedback associated with the PDSCH, wherein one or more instances of the PUCCH are transmitted across one or more uplink slots or sub-slots based at least in part on the PUCCH repetition factor indicated in the DCI.

In some aspects, a method of wireless communication performed by a base station includes: transmitting, to a UE, DCI scheduling a PDSCH and indicating a PUCCH repetition factor; and receiving, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI.

In some aspects, a UE for wireless communication includes a memory and one or more processors, coupled with the memory, configured to: receive, from a base station, DCI scheduling a PDSCH and indicating a PUCCH repetition factor; and transmit, to the base station, a PUCCH that includes HARQ-ACK feedback associated with the PDSCH, wherein one or more instances of the PUCCH are transmitted across one or more uplink slots or sub-slots based at least in part on the PUCCH repetition factor indicated in the DCI.

In some aspects, a base station for wireless communication includes a memory and one or more processors, coupled with the memory, configured to: transmit, to a UE, DCI scheduling a PDSCH and indicating a PUCCH repetition factor; and receive, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI.

In some aspects, a non-transitory computer-readable medium storing a set of instructions for wireless communication includes one or more instructions that, when executed by one or more processors of a UE, cause the UE to: receive, from a base station, DCI scheduling a PDSCH and indicating a PUCCH repetition factor; and transmit, to the base station, a PUCCH that includes HARQ-ACK feedback associated with the PDSCH, wherein one or more instances of the PUCCH are transmitted across one or more uplink slots or sub-slots based at least in part on the PUCCH repetition factor indicated in the DCI.

In some aspects, a non-transitory computer-readable medium storing a set of instructions for wireless communication includes one or more instructions that, when executed by one or more processors of a base station, cause the base station to: transmit, to a UE, DCI scheduling a PDSCH and indicating a PUCCH repetition factor; and receive, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI.

In some aspects, an apparatus for wireless communication includes: means for receiving, from a base station, DCI scheduling a PDSCH and indicating a PUCCH repetition factor; and means for transmitting, to the base station, a PUCCH that includes HARQ-ACK feedback associated with the PDSCH, wherein one or more instances of the PUCCH are transmitted across one or more uplink slots or sub-slots based at least in part on the PUCCH repetition factor indicated in the DCI.

In some aspects, an apparatus for wireless communication includes: means for transmitting, to a UE, DCI scheduling a PDSCH and indicating a PUCCH repetition factor; and means for receiving, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
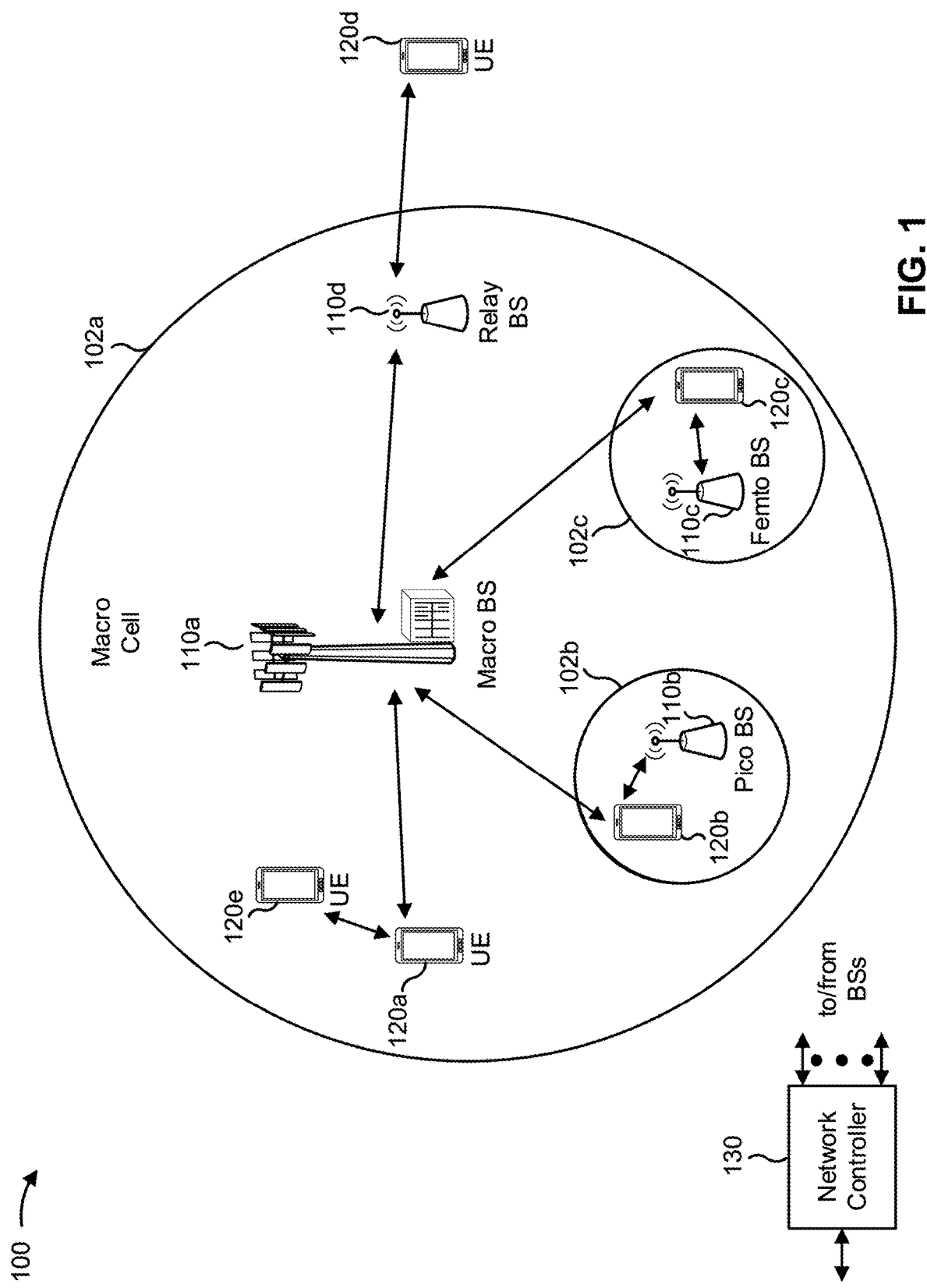
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
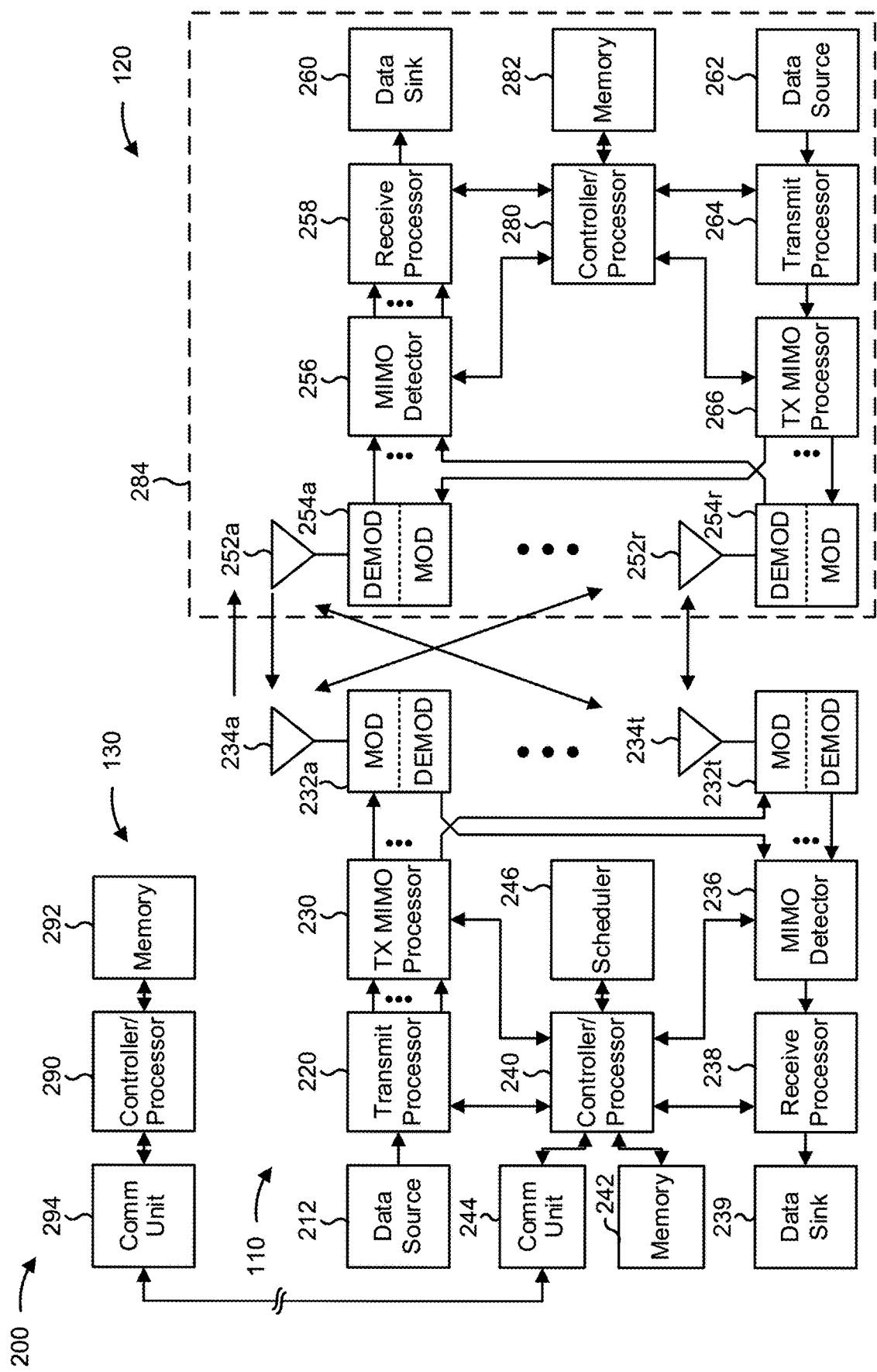
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5B, FIG. 6, and/or FIG. 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5B, FIG. 6, and/or FIG. 7).

Controller/processor 240 of base station 110, controller/processor 280 of UE 120, and/or any other component(s) of FIG. 2 may perform one or more techniques associated with dynamic repetition and frequency hopping factors for a physical uplink control channel (PUCCH), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving, from base station 110, downlink control information (DCI) scheduling a physical downlink shared channel (PDSCH) and indicating a PUCCH repetition factor, means for transmitting, to base station 110, a PUCCH that includes hybrid automatic repeat request acknowledgement (HARQ-ACK) feedback associated with the PDSCH, wherein one or more instances of the PUCCH are transmitted across one or more uplink slots or sub-slots based at least in part on the PUCCH repetition factor indicated in the DCI, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, DCI scheduling a PDSCH and indicating a PUCCH repetition factor, means for receiving, from UE 120, a PUCCH that includes HARQ-ACK feedback associated with the PDSCH, wherein one or more instances of the PUCCH are received across one or more uplink slots or sub-slots based at least in part on the PUCCH repetition factor indicated in the DCI, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
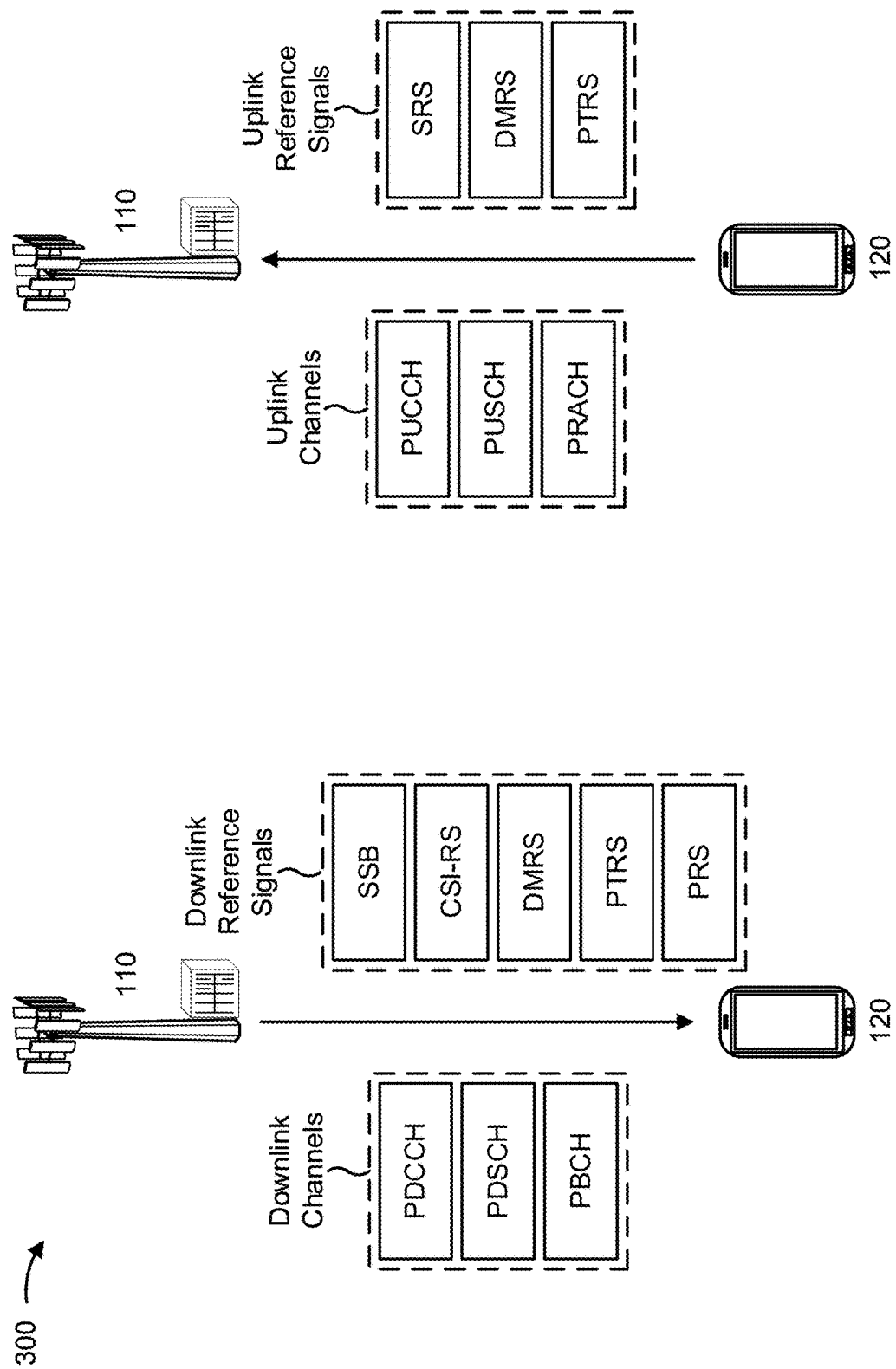
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit HARQ-ACK feedback that includes acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, a PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve hearability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
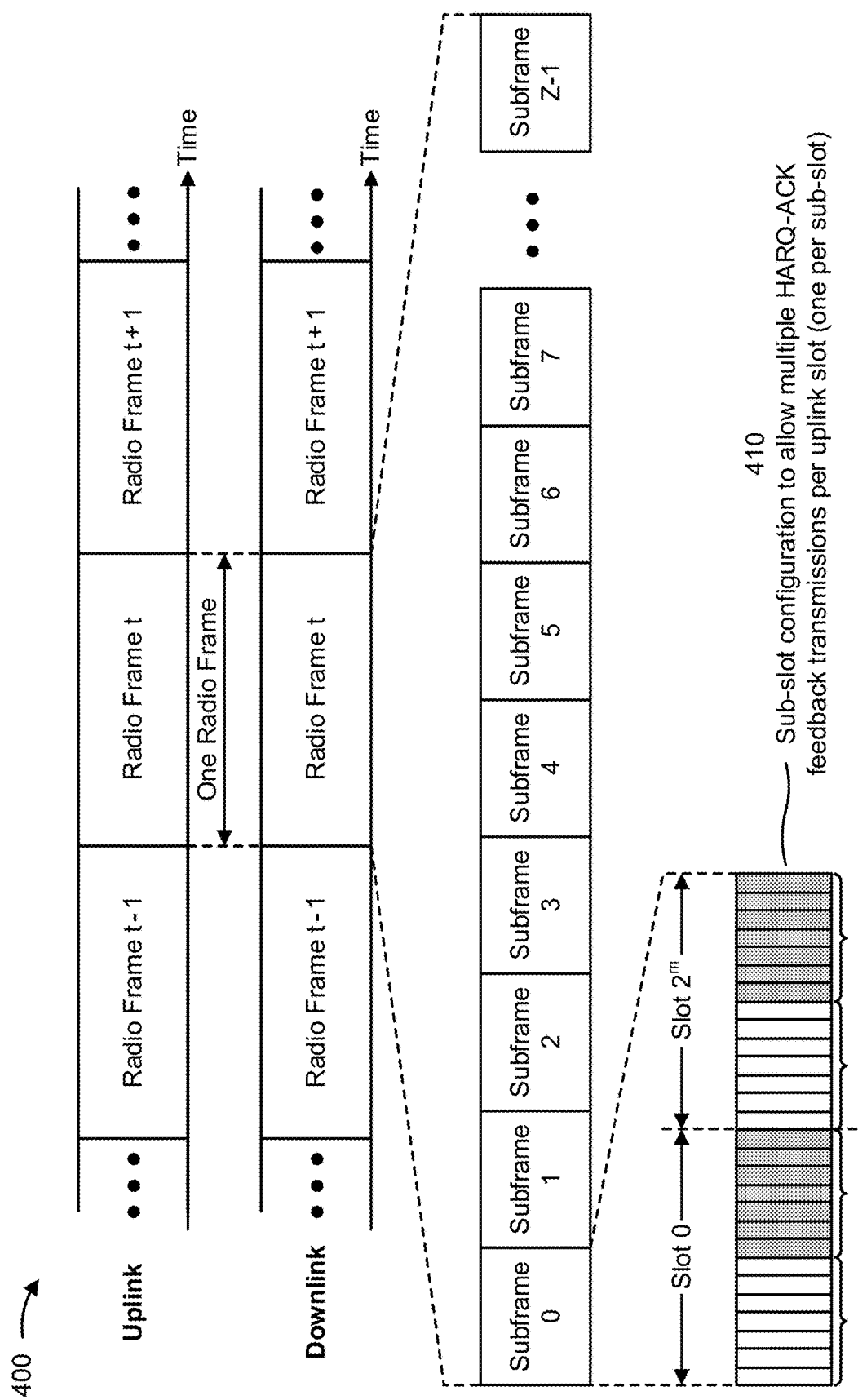
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 may be used for frequency division duplexing (FDD) in a telecommunication system, such as LTE, NR, and/or the like. For example, as shown, the FDD configuration may include an uplink frequency in which uplink transmissions may be performed, and the uplink frequency may be paired with a downlink frequency in which downlink transmissions may be performed. However, it will be appreciated that the same or a similar frame structure may be used for time division duplexing (TDD), where uplink and downlink transmissions are performed in the same frequency at separate times.

In some aspects, as shown in FIG. 4, the frame structure includes a transmission timeline that may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 4, where m is an index of a numerology used for a transmission, such as 0, 1, 2, 3, 4, and/or the like). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit may be frame-based, subframe-based, slot-based, mini-slot based, sub-slot based, symbol-based, and/or the like.

For example, in a wireless network (e.g., wireless network 100 and/or the like), a base station may transmit one or more downlink communications to a UE, such as a PDSCH, a PDCCH scheduling the PDSCH, and/or the like. The UE may attempt to decode the downlink communication(s) and transmit, to the base station, a PUCCH that includes HARQ-ACK feedback to indicate whether the PDSCH scheduled by the PDCCH was successfully received and/or decoded. For example, in cases where the UE receives and is able to decode the PDSCH, the HARQ-ACK feedback may include an ACK to indicate that the PDSCH was received and successfully decoded. Alternatively, in cases where the UE does not receive the PDSCH or is unable to successfully decode the PDSCH, the HARQ-ACK feedback may include a NACK to indicate that the PDSCH was not received and/or unsuccessfully decoded, which may trigger a retransmission of the PDSCH by the base station. However, some wireless networks are associated with a restriction that limits a UE to one HARQ-ACK feedback transmission per uplink slot. This may increase latency associated with HARQ-ACK feedback because a UE has to wait until a next uplink slot to transmit another PUCCH that includes HARQ-ACK feedback, which may result in unacceptable performance for delay-sensitive services (e.g., an ultra-reliable low-latency communication (URLLC) service that requires a latency of 1 ms or less).

Accordingly, as shown in FIG. 4, and by reference number 410, a frame structure may be associated with a sub-slot configuration that allows more than one HARQ-ACK feedback transmission by a UE in a single uplink slot. For example, FIG. 4 illustrates a seven (7) OFDM symbol sub-slot configuration that can allow up to two (2) HARQ-ACK feedback transmissions per slot. In another example, a two (2) OFDM symbol sub-slot configuration can allow up to seven (7) HARQ-ACK feedback transmissions per slot. In general, the sub-slot configuration applies only to HARQ-ACK feedback, and does not apply to PDCCH, PDSCH, and/or PUSCH transmissions or to K0 or K2 parameters that relate to scheduling offsets between scheduling DCI and dynamically scheduled PDSCH or PUSCH transmissions. In other words, the sub-slot configuration may be used to partition a slot into multiple sub-slots such that a UE can transmit one PUCCH that includes HARQ-ACK feedback per sub-slot. For example, a base station may transmit information related to a sub-slot configuration to a UE, and may indicate a value for a K1 parameter that applies to HARQ-ACK feedback to be carried in a PUCCH. In particular, the K1 parameter may indicate a scheduling offset from PDSCH reception to HARQ-ACK feedback transmission, and may generally have a sub-slot granularity if a sub-slot configuration is enabled or a slot granularity if a sub-slot configuration is not enabled (e.g., if the base station configures the K1 parameter to have a value of two (2), the UE may be configured to transmit HARQ-ACK feedback two (2) sub-slots after PDSCH reception if a sub-slot configuration is enabled, or two (2) slots after PDSCH reception if a sub-slot configuration is not enabled). In this way, the sub-slot configuration may enable faster HARQ-ACK feedback, which may reduce the latency associated with retransmissions that may be needed for downlink transmissions that were not received and/or were unsuccessfully decoded by the UE.

Although a sub-slot configuration may enable faster HARQ-ACK feedback for a UE, existing techniques to configure a sub-slot are subject to certain constraints. For example, a UE is allowed to have only one sub-slot configuration, and a radio resource control (RRC) reconfiguration is needed if a base station needs to change a sub-slot configuration (e.g., by increasing or decreasing the number of symbols that make up a sub-slot due to a change in channel conditions). For example, a base station may configure a sub-slot with two (2) OFDM symbols for URLLC service to increase the number of opportunities that are available for a UE to transmit HARQ-ACK feedback within a single uplink slot. Accordingly, a UE is limited to using two (2) OFDM symbols to transmit the HARQ-ACK feedback because the sub-slot configuration may be associated with a restriction whereby a HARQ-ACK resource (e.g., time and frequency resources used to transmit HARQ-ACK feedback) cannot cross a sub-slot boundary. This restriction may negatively impact performance of the PUCCH transmission, because energy that a UE uses to transmit on an uplink linearly scales with the number of OFDM symbols over which the uplink transmission is performed (e.g., the UE can transmit with more energy, or a higher transmit power, when an uplink transmission is performed over a larger number of OFDM symbols). Accordingly, when a UE is located at a cell-edge or another limited uplink coverage scenario, limiting the number of symbols in a sub-slot (and therefore the number of symbols over which the UE can accumulate transmission energy) may result in the PUCCH transmission failing to reach the base station. Although modifying the sub-slot configuration (e.g., to increase the number of OFDM symbols in a sub-slot) may be one way to address this issue, an RRC reconfiguration imposes a lengthy delay (e.g., around 10 milliseconds), which may be insufficient to meet the requirements of latency-sensitive services.

Some aspects described herein relate to dynamic repetition and frequency hopping factors for a PUCCH that is transmitted in one or more uplink slots or sub-slots. For example, a base station may transmit, and a UE may receive, information dynamically indicating a PUCCH repetition factor that indicates a number of times that a PUCCH is to be transmitted across one or more uplink slots or sub-slots. For example, a PUCCH repetition factor having a value of N may indicate that N instances of a PUCCH are to be transmitted (e.g., one initial PUCCH transmission and N−1 repetitions of the PUCCH) across N uplink slots or N uplink sub-slots. In this way, the PUCCH repetition factor may be used to dynamically control a number of uplink slots or uplink sub-slots in which the UE may transmit the PUCCH. In this way, the UE may be configured with a larger PUCCH repetition factor to enable the UE to transmit the PUCCH with more energy and higher reliability over a larger number of uplink slots or sub-slots. Additionally, or alternatively, the UE may be configured with a smaller PUCCH repetition factor to reduce PUCCH latency. Furthermore, in some aspects, the base station may transmit, and the UE may receive, information dynamically indicating a PUCCH frequency hopping factor that indicates a number of frequency hops in which the PUCCH is to be transmitted across the one or more slots or sub-slots. In this way, the UE may transmit one or more instances of the PUCCH in different frequencies, which may increase frequency diversity, robustness, reliability, and/or the like for the PUCCH transmission. Furthermore, in cases where the UE is configured to transmit multiple PUCCHs that overlap in time, the UE may multiplex a payload of all of the overlapping PUCCHs into a highest priority PUCCH. For example, the PUCCH with the highest priority may be a PUCCH with an earliest initial transmission time, a PUCCH with a largest repetition factor, a PUCCH scheduled by a most recently received DCI, a PUCCH with a largest frequency hopping factor, and/or the like.

As indicated above, FIG. 4 is provided as an example. Other examples may differ from what is described with respect to FIG. 4.

Figure 5A:
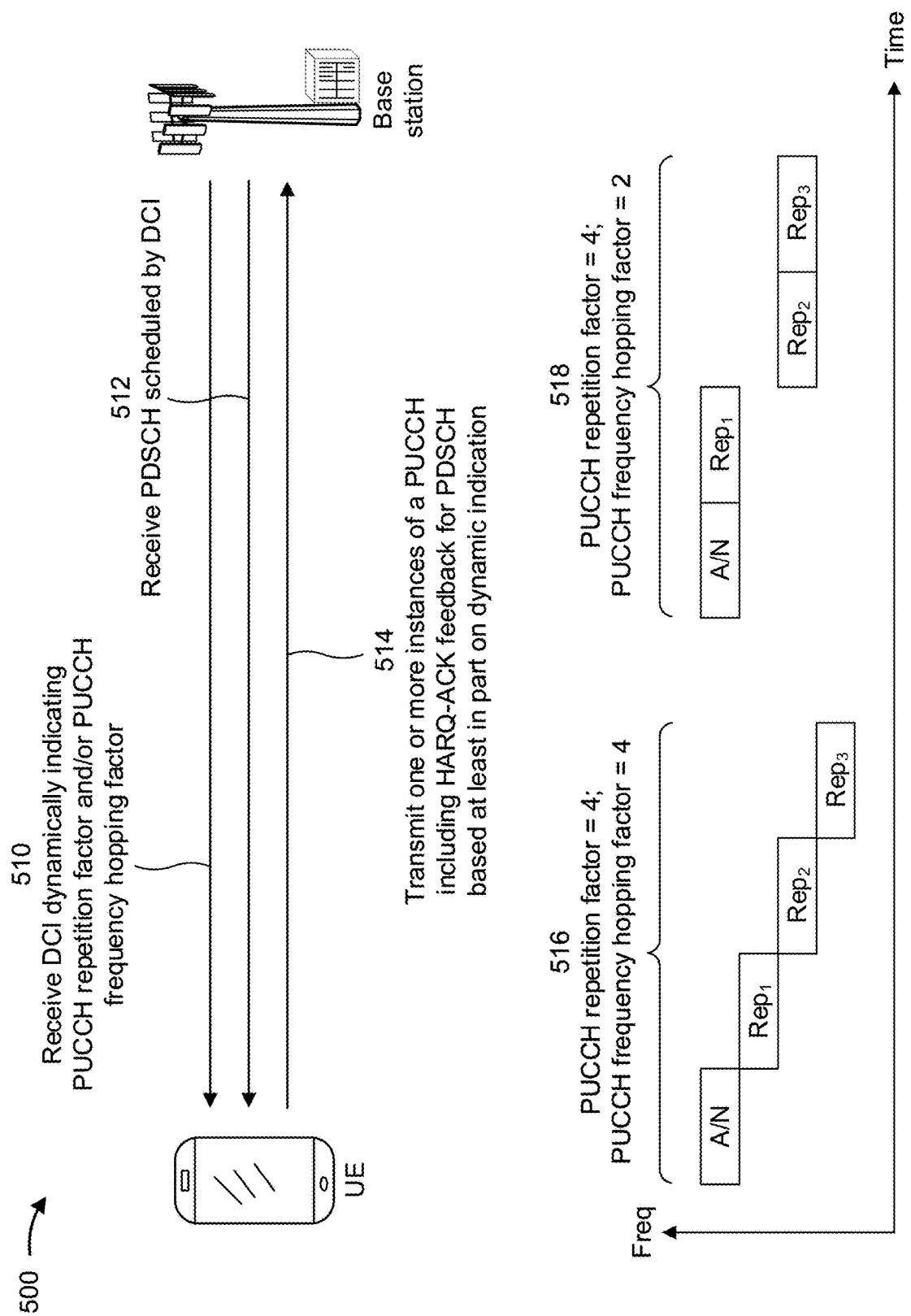
FIGS. 5A-5B are diagrams illustrating examples associated with dynamic repetition and frequency hopping factors for a physical uplink control channel (PUCCH), in accordance with the present disclosure.
Figure 5B:
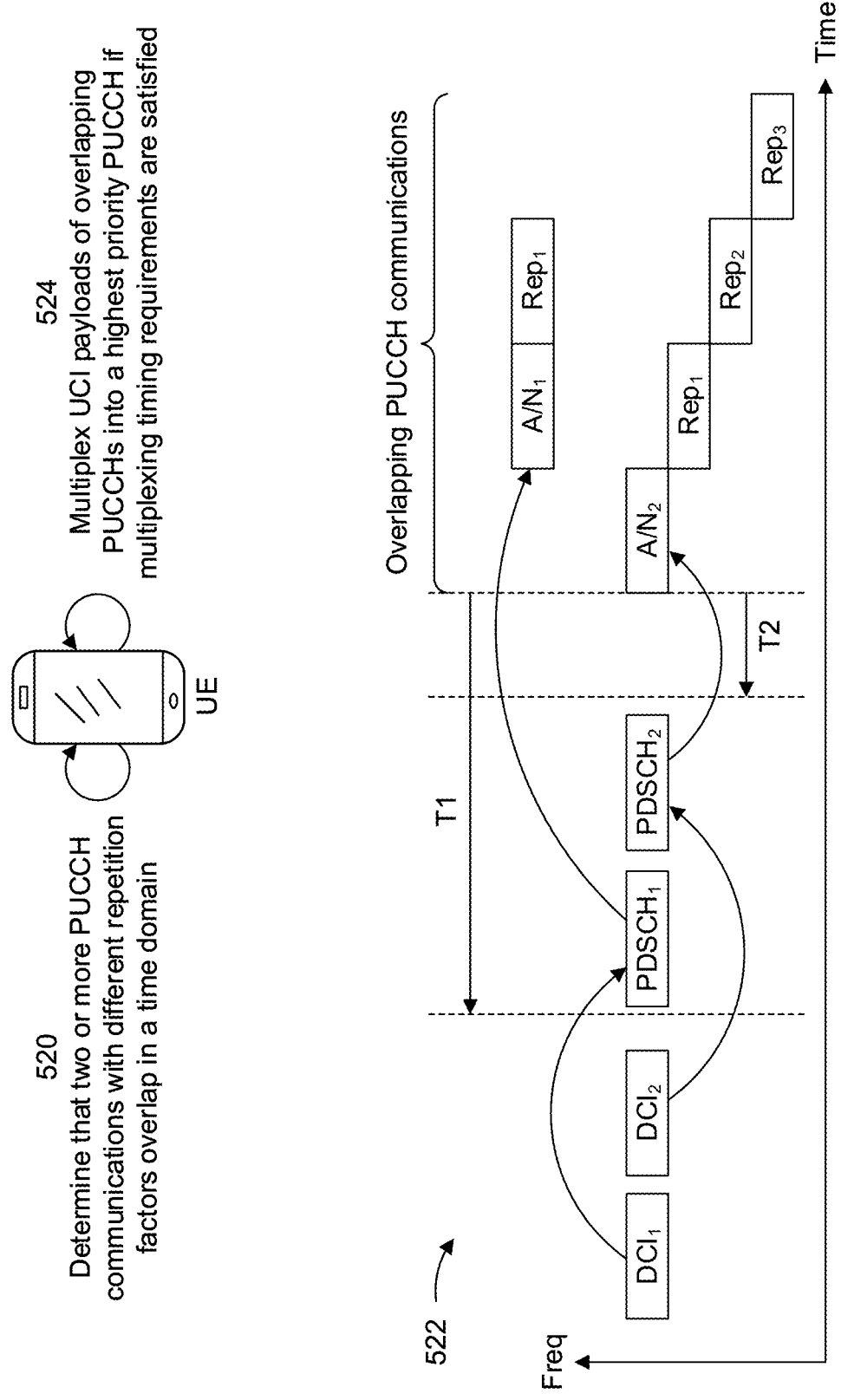

FIGS. 5A-5B are diagrams illustrating examples 500 of dynamic repetition and frequency hopping factors for a PUCCH, in accordance with the present disclosure. As shown in FIG. 5, examples 500 include a base station (e.g., base station 110 and/or the like) in communication with a UE (e.g., UE 120) in a wireless network (e.g., wireless network 100 and/or the like).

As shown in FIG. 5A, and by reference number 510, the base station may transmit, and the UE may receive, downlink control information (DCI) dynamically indicating a PUCCH repetition factor and/or a PUCCH frequency hopping factor. For example, prior to the base station transmitting the DCI to dynamically schedule one or more PDSCH transmissions to the UE, the base station may transmit, and the UE may receive, RRC signaling to configure a set of multiple PUCCH repetition factors. Accordingly, in some aspects, the DCI that dynamically schedules the one or more PDSCH transmissions may include one or more bits to dynamically indicate the PUCCH repetition factor among the set of multiple PUCCH repetition factors. For example, the set of multiple PUCCH repetition factors may generally include up to $2^X$ members, and the DCI may include Xbits to indicate one of the $2^X$ PUCCH repetition factors that the UE is to use when transmitting a PUCCH that includes HARQ-ACK feedback for the PDSCH transmission(s) scheduled by the DCI. For example, the set of PUCCH repetition factors configured by the RRC signaling may include four (or $2^2$) members (e.g., {1, 2, 4, 8}), in which case the DCI may include two bits to uniquely indicate one of the members in the set of PUCCH repetition factors.

In general, a PUCCH repetition factor of one (1) may indicate no PUCCH repetitions, and a PUCCH repetition factor of N may indicate that the UE is to transmit a PUCCH and N−1 repetitions of the PUCCH. In other words, the PUCCH repetition factor may generally indicate a total number of times that the UE is to transmit the PUCCH that includes the HARQ-ACK feedback for the PDSCH transmission(s) scheduled by the DCI. Accordingly, the DCI may indicate a PUCCH repetition factor that has a value greater than one (1) to enable the UE to transmit a PUCCH and one or more repetitions of the PUCCH over multiple uplink slots or uplink sub-slots. In this way, the UE may accumulate more energy when transmitting the PUCCH and the one or more repetitions of the PUCCH, which may increase coverage and reliability of the PUCCH transmissions. For example, in cases where the UE is configured with a sub-slot configuration that includes two (2) OFDM symbols, a PUCCH repetition factor of four (4) may enable the UE to transmit the PUCCH and three (3) repetitions of the PUCCH over a total of eight (8) OFDM symbols, which may significantly increase the accumulated energy used to transmit the PUCCH relative to a two-symbol PUCCH transmission that is otherwise restricted to not cross a sub-slot boundary.

In some aspects, prior to the base station transmitting the DCI to dynamically schedule the one or more PDSCH transmissions to the UE, the base station may further transmit, and the UE may further receive, RRC signaling to configure a set of multiple PUCCH frequency hopping factors. Accordingly, in some aspects, the DCI that dynamically schedules the one or more PDSCH transmissions may include one or more bits to dynamically indicate, among the set of multiple PUCCH repetition factors, a PUCCH frequency hopping factor that the UE is to use when transmitting the PUCCH that includes the HARQ-ACK feedback for the PDSCH transmission(s) scheduled by the DCI. For example, the set of PUCCH frequency hopping factors may generally include up to $2^Y$ members, and the DCI may include Y bits to indicate one of the $2^Y$ PUCCH repetition factors that the UE is to use when transmitting a PUCCH that includes HARQ-ACK feedback for the PDSCH transmission(s) scheduled by the DCI. For example, the DCI may include two bits to uniquely indicate one of the members in a set of PUCCH frequency hopping factors having four members, three bits to uniquely indicate one of the members in a set of PUCCH frequency hopping factors having eight members, and/or the like.

In general, similar to the PUCCH repetition factor, a PUCCH frequency hopping factor of one (1) may indicate no frequency hopping for the PUCCH transmission, and a PUCCH repetition factor of M may indicate that the UE is to transmit a PUCCH and N−1 repetitions of the PUCCH over M frequencies. In other words, the PUCCH frequency hopping factor may indicate a total number of frequencies that the UE is to use to transmit the PUCCH that includes the HARQ-ACK feedback for the PDSCH transmission(s) scheduled by the DCI. Accordingly, the DCI may indicate a PUCCH frequency hopping factor that has a value greater than one (1) to enable the UE to transmit a PUCCH and one or more repetitions of the PUCCH using different frequencies over multiple uplink slots or uplink sub-slots. Furthermore, in some aspects, a step size between the different frequencies may be preconfigured (e.g., fixed, defined in a wireless communication standard, and/or the like), configured by RRC signaling, configured by the DCI that indicates the PUCCH frequency hopping factor, and/or the like. In this way, when frequency hopping is enabled (e.g., with a PUCCH frequency hopping factor greater than 1), the UE may determine the particular frequencies in which to transmit the PUCCH and/or the one or more repetitions of the PUCCH based at least in part on a frequency resource that is configured for the initial PUCCH transmission and the configured step size. In this way, when the UE is configured to transmit multiple instances of the PUCCH that includes the HARQ-ACK feedback for the PDSCH transmission(s) scheduled by the DCI (e.g., an initial PUCCH transmission and one or more repetitions of the PUCCH transmission), the PUCCH frequency hopping factor indicated in the DCI can be used to configure the UE to transmit the multiple instances of the PUCCH in different frequencies to increase frequency diversity, robustness, and/or the like for the PUCCH transmission(s).

In some aspects, as described above, the DCI that dynamically schedules the PDSCH transmission(s) to the UE may include Xbits to dynamically indicate a PUCCH repetition factor from a set including up to $2^X$ PUCCH repetition factors. Furthermore, in cases where the DCI dynamically indicates a PUCCH frequency hopping factor, the DCI may include Y bits to dynamically indicate a PUCCH frequency hopping factor from a set including up to $2^Y$ PUCCH frequency hopping factors. Alternatively, to save signaling overhead, the DCI may include Z bits to jointly indicate the PUCCH repetition factor and the PUCCH frequency hopping factor, where Z<X+Y. For example, if the set of PUCCH repetition factors and the set of PUCCH frequency hopping factors each include four (4) members such that X and Y are both equal to two (2), the DCI may include three (3) bits to jointly indicate the PUCCH repetition factor and the PUCCH frequency hopping factor. In this case, a total number of combinations of PUCCH repetition and frequency hopping factors may be down-selected to include $2^Z$ combinations. For example, in cases where the set of PUCCH repetition factors and the set of PUCCH frequency hopping factors each include four (4) members, the resulting sixteen (16) possible combinations may be down-selected to eight (8) combinations such that one combination can be uniquely indicated by three (3) bits. For example, the RRC signaling may indicate a set of PUCCH repetition and frequency hopping factor combinations, or the possible combinations of PUCCH repetition and frequency hopping factors may be down-selected to $2^Z$ (or fewer) members by additional signaling (e.g., a medium access control (MAC) control element (MAC-CE)).

Notably, the PUCCH frequency hopping factor may generally be less than or equal to the PUCCH repetition factor, because the number of instances of the PUCCH that are transmitted may constrain the number of different frequencies in which the PUCCH can be transmitted. Accordingly, the combinations of PUCCH repetition and frequency hopping factors that can be jointly indicated may exclude one or more incompatible combinations, and/or may be selected to improve coverage, reliability, diversity, robustness, and/or the like. For example, a PUCCH repetition factor of one (1), meaning no PUCCH repetitions, cannot be paired with a PUCCH frequency hopping factor greater than one (1) because one transmission cannot be transmitted in multiple frequency hops. Similarly, a PUCCH repetition factor of two (2) can be paired only with PUCCH frequency hopping factors of one (1) or two (2) because two transmissions can be transmitted in a maximum of two frequency hops. In another example, the base station may determine that a PUCCH repetition factor of eight (8) is to be paired only with PUCCH frequency hopping factors of four (4) or eight (8) to improve frequency diversity and robustness for a large number of PUCCH repetitions.

Accordingly, to enable joint signaling of the PUCCH repetition factor and the PUCCH frequency hopping factor, the base station may prune the total possible combinations of PUCCH repetition and frequency hopping factors to exclude incompatible combinations, and further down-selection may be performed (e.g., by the base station using RRC signaling, a MAC-CE, DCI, and/or the like) to reduce the total number of combinations to no more than $2^Z$ combinations, where Z is generally less than the total number of bits that would be needed to separately indicate the PUCCH repetition factor and the PUCCH frequency hopping factor using different DCI fields.

As further shown in FIG. 5A, and by reference number 512, the base station may transmit, to the UE, one or more PDSCH transmissions scheduled by the DCI. Accordingly, in some aspects, the UE may generate HARQ-ACK feedback for the PDSCH transmission(s) based at least in part on whether the UE successfully receives and/or decodes the PDSCH transmission(s) scheduled by the DCI. For example, due to coverage issues, penetration loss, beam blockage, and/or the like, the PDSCH transmission(s) scheduled by the DCI may fail to reach the UE. Alternatively, in some cases, the UE may receive the PDSCH transmission(s) scheduled by the DCI, but the UE may be unable to successfully decode the PDSCH transmission(s). In either case, the HARQ-ACK feedback generated by the UE may include a negative acknowledgement (NACK) to request that the base station retransmit the PDSCH(s). Alternatively, in cases where the UE receives and successfully decodes the PDSCH transmission(s) scheduled by the DCI, the HARQ-ACK feedback generated by the UE may include an ACK to indicate that the base station does not need to retransmit the PDSCH(s). Accordingly, in some aspects, the UE may prepare an uplink control information (UCI) payload that includes the HARQ-ACK feedback for the PDSCH transmission(s) scheduled by the DCI to be transmitted to the base station in one or more instances of a PUCCH.

As further shown in FIG. 5A, and by reference number 514, the UE may transmit, to the base station, the one or more instances of the PUCCH that include the HARQ-ACK feedback for the PDSCH transmission(s) scheduled by the DCI based at least in part on the PUCCH repetition factor and/or the PUCCH frequency hopping factor dynamically indicated in the scheduling DCI. For example, as described above, the DCI scheduling the PDSCH transmission(s) may indicate at least the PUCCH repetition factor to indicate the number of instances of the PUCCH that the UE is to transmit for the PDSCH transmission(s) scheduled by the DCI. Furthermore, in some aspects, the DCI scheduling the PDSCH transmission(s) may further indicate a PUCCH frequency hopping factor to indicate the number of frequency hops in which the UE is to transmit the PUCCH that includes the HARQ-ACK feedback for the PDSCH transmission(s) scheduled by the DCI. For example, as described above, the PUCCH frequency hopping factor may be indicated separately from the PUCCH repetition factor, may be indicated jointly with the PUCCH repetition factor, or may be omitted from the DCI scheduling the PDSCH transmission(s) to the UE.

Accordingly, the UE may generally determine the number of instances of the PUCCH to be transmitted based at least in part on the PUCCH repetition factor indicated in the DCI, and may further indicate the number of frequency hops in which to transmit the PUCCH in cases where the DCI also indicates a PUCCH frequency hopping factor. For example, reference number 516 illustrates a case where the DCI indicates a PUCCH repetition factor of four (4) and a PUCCH frequency hopping factor of four (4). In this case, the UE may transmit a first PUCCH communication that includes the HARQ-ACK feedback (e.g., ACK/NACK feedback, shown as A/N) for the PDSCH transmission(s) in a first uplink slot or uplink sub-slot, which is followed by three repetitions of the PUCCH in subsequent uplink slots or uplink sub-slots. Additionally, because the DCI indicates four frequency hops, each instance of the PUCCH communication is transmitted in a different frequency. In another example, reference number 518 illustrates a case where the DCI indicates a PUCCH repetition factor of four (4) and a PUCCH frequency hopping factor of two (2). In this case, the UE may similarly transmit four instances of the PUCCH communication across four uplink slots or uplink sub-slots, but the four total transmissions are transmitted in two frequency hops. For example, an initial transmission and a first repetition are transmitted in a first frequency, and a second and third repetition are transmitted in a second frequency. In addition, although FIG. 5A illustrates examples where multiple instances of the PUCCH are transmitted across consecutive uplink slots or sub-slots, the base station may configure the UE to transmit the multiple instances of the PUCCH across discontinuous uplink slots or sub-slots.

In some aspects, the foregoing description may be generally applicable in cases where a UE receives a single DCI scheduling one or more PDSCH transmissions associated with HARQ-ACK feedback to be transmitted in one or more instances of a PUCCH across one or more uplink slots or sub-slots (e.g., based at least in part on a PUCCH repetition factor indicated in the scheduling DCI) and/or across one or more frequencies (e.g., based at least in part on a PUCCH frequency hopping factor indicated in the scheduling DCI). However, in some cases, the UE may be configured to transmit two or more different PUCCHs (e.g., PUCCHs with different payloads) that may be associated with different PUCCH repetition factors. Accordingly, in cases where the two or more PUCCHs that are associated with different PUCCH repetition factors overlap in a time domain, the UE may need to resolve relative priorities and/or timing requirements associated with the PUCCHs to determine whether and/or how to multiplex the two or more PUCCHs into a single PUCCH.

For example, as shown in FIG. 5B, and by reference number 520, the UE may determine that two or more PUCCH communications with different PUCCH repetition factors overlap in a time domain. In this case, it will be appreciated that the two or more PUCCH communications that overlap in the time domain include different UCI payloads, distinct from a PUCCH and one or more PUCCH repetitions that include a common UCI payload. For example, as shown by reference number 522, the UE may receive a first DCI (shown as $DCI_1$) that schedules a first PDSCH (shown as $PDSCH_1$), which is associated with a first PUCCH that has a first payload (shown as $A/N_1$) and a PUCCH repetition factor of two (2) (e.g., an initial transmission and one repetition). Furthermore, in the illustrated example, the first PUCCH is associated with a PUCCH frequency hopping factor of one (1), or is not associated with a PUCCH frequency hopping factor. Furthermore, after receiving the first DCI, the UE may receive a second DCI (shown as $DCI_2$) that schedules a second PDSCH (shown as $PDSCH_2$), which is associated with a second PUCCH that has a second payload (shown as $A/N_2$), a PUCCH repetition factor of four (4) (e.g., an initial transmission and three repetitions), and a PUCCH frequency hopping factor of four (4) (e.g., each instance of the second PUCCH is transmitted in a different frequency). Accordingly, because the two instances of the first PUCCH overlap with the first and second repetition of the second PUCCH, the UE may determine whether and/or how to multiplex the two PUCCHs into a single PUCCH based at least in part on relative priorities and/or timing requirements of the PUCCHs.

As further shown in FIG. 5B, and by reference number 524, the UE may multiplex UCI payloads of the overlapping PUCCHs into a highest priority PUCCH if one or more multiplexing timing requirements are satisfied. In some aspects, the multiplexing timing requirement(s) may be defined to ensure that the UE has sufficient time to receive, decode, and/or otherwise process one or more downlink communications that are associated with the overlapping PUCCHs. For example, the one or more multiplexing timing requirements may include a requirement that the UE receive any DCI that schedules a PUCCH (e.g., by scheduling a PDSCH associated with HARQ-ACK feedback to be carried in a PUCCH) to be multiplexed into a higher priority PUCCH at least a threshold time prior to transmission of the highest priority PUCCH. Furthermore, the DCI that schedules the higher priority PUCCH to be multiplexed with one or more lower-priority PUCCHs may also need to be received at least the threshold time prior to the transmission of the highest priority PUCCH.

Additionally, or alternatively, the one or more multiplexing timing requirements may include a requirement that the UE receive any PDSCH that is associated with HARQ-ACK feedback to be multiplexed into a higher-priority PUCCH at least a threshold time prior to transmission of the highest priority PUCCH. In some aspects, the threshold time that is defined for reception of a PDSCH associated with HARQ-ACK feedback to be multiplexed into the PUCCH with the highest priority may generally be shorter than the threshold time that is defined for reception of a DCI scheduling the PDSCH associated with the HARQ-ACK feedback to be multiplexed into the PUCCH with the highest priority (e.g., because DCI scheduling a PDSCH is generally received earlier in time than the PDSCH scheduled by the DCI). Furthermore, in some aspects, the PDSCH associated with the HARQ-ACK feedback to be carried in the PUCCH with the highest priority may be required to be received at the UE at least the threshold time prior to the transmission of the highest priority PUCCH. In this way, the multiplexing timing requirements may ensure that the UE has adequate time to decode the DCIs that schedule the PDSCHs and the overlapping PUCCHs, and may further ensure that the UE has adequate time to decode the PDSCHs to determine the HARQ-ACK feedback to be multiplexed in the payload of the highest priority PUCCH.

Accordingly, when the UE determines that there are two or more PUCCHs with different repetition factors that overlap in the time domain, the UE may determine a highest priority PUCCH among the two or more PUCCHs and may then multiplex the payloads of the two or more PUCCHs into the highest priority PUCCH if the multiplexing timing requirements described above are satisfied. For example, in some aspects, the highest priority PUCCH may be a PUCCH that has an earliest transmission time, a PUCCH that has a largest PUCCH repetition factor, a PUCCH scheduled by a most recently received DCI, a PUCCH that has a largest frequency hopping factor, and/or the like. For example, in FIG. 5B, the UE may determine that the second PUCCH (carrying $A/N_2$) for the second PDSCH scheduled by the second DCI has a higher priority than the first PUCCH (carrying $A/N_1$) based at least in part on the second PUCCH having an earliest transmission time, which may enable the UE to start transmitting the multiplexed HARQ-ACK feedback for both PDSCHs earlier in time. Additionally, or alternatively, the second PUCCH may have a higher priority based at least in part on the second PUCCH having a larger PUCCH repetition factor, which enables the UE to transmit the multiplexed HARQ-ACK feedback for both PDSCHs with more energy. Additionally, or alternatively, the second PUCCH may have a higher priority based at least in part on the second PUCCH being scheduled by a most recent DCI, which enables the base station to dynamically change PUCCH transmission parameters (e.g., repetition and/or frequency hopping factors) according to changing conditions (e.g., network loading, a location of the UE within a cell, and/or the like). Additionally, or alternatively, the second PUCCH may have a higher priority based at least in part on the second PUCCH having a larger PUCCH frequency hopping factor, which enables the UE to transmit the multiplexed HARQ-ACK feedback with more frequency diversity.

Accordingly, based at least in part on the UE determining that the second PUCCH has the highest priority among the overlapping PUCCHs, the UE may multiplex the UCI payloads of the overlapping PUCCHs into the second (highest priority) PUCCH based at least in part on determining that one or more multiplexing timing requirements are satisfied. For example, in FIG. 5B, a first threshold time (T1) may be defined relative to a starting transmission time (e.g., a starting OFDM symbol) for the first transmission instance of the second PUCCH that has the highest priority. In this case, because the first DCI that schedules the first PUCCH to be multiplexed into the second PUCCH and the second DCI that schedules the second PUCCH associated with the highest priority are both received at least the threshold time prior to transmission of the second PUCCH, the requirement that the UE receive any DCI that schedules a PUCCH to be multiplexed into a higher priority PUCCH at least a threshold time prior to transmission of the highest priority PUCCH is satisfied.

Furthermore, a second threshold time (T2) may be defined relative to the starting transmission time for the first transmission instance of the second PUCCH that has the highest priority. In this case, because the first PDSCH and the second PDSCH are both received at least the threshold time prior to transmission of the second PUCCH, the requirement that the UE receive any PDSCH associated with HARQ-ACK feedback to be multiplexed in a PUCCH with a highest priority at least a threshold time prior to transmission of the highest priority PUCCH is satisfied. The UE may therefore decode the first PDSCH and the second PDSCH, generate the respective HARQ-ACK feedback to indicate whether the decoding attempt was successful for the first PDSCH and the second PDSCH, and may multiplex the HARQ-ACK feedback for both PDSCHs into the second PUCCH with the highest priority. The UE may then transmit one or more instances of the highest priority PUCCH according to the PUCCH repetition factor and/or the PUCCH frequency hopping factor indicated in the scheduling DCI associated with the highest priority PUCCH.

As indicated above, FIGS. 5A-5B are provided as examples. Other examples may differ from what is described with respect to FIGS. 5A-5B.

Figure 6:
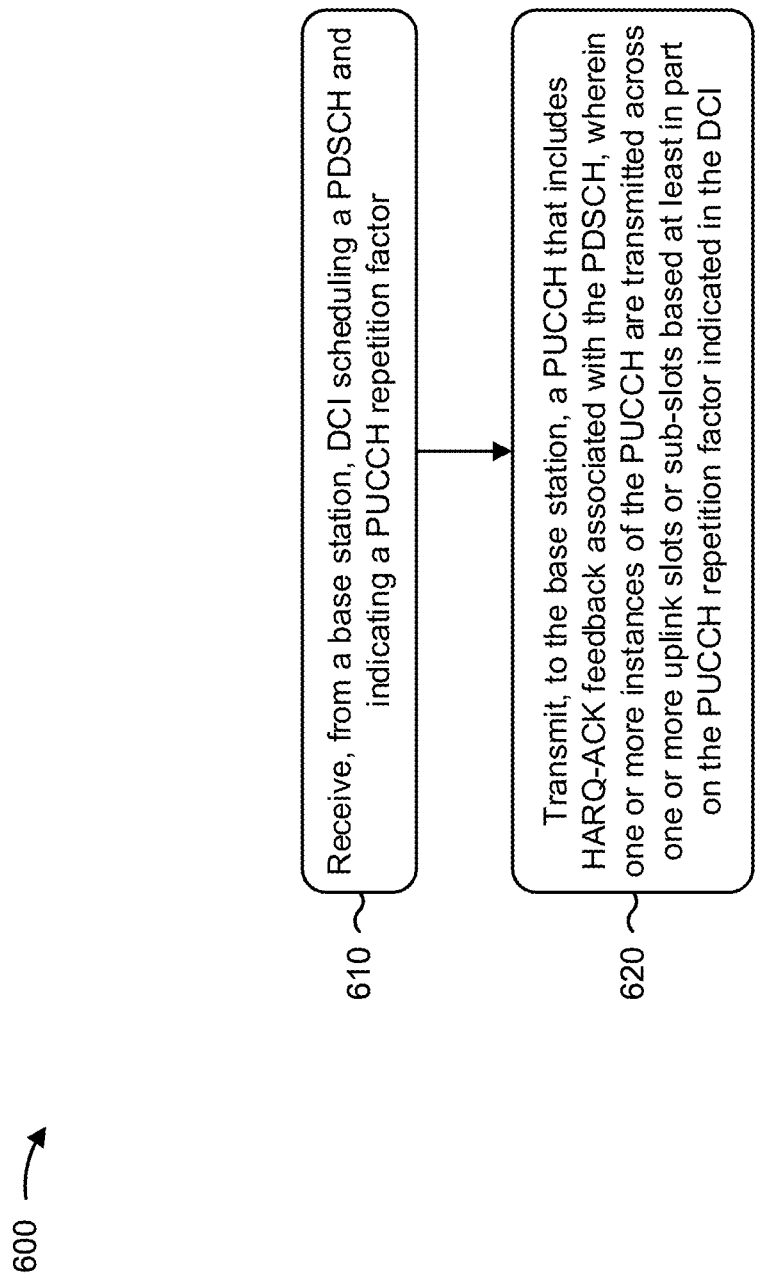
FIGS. 6-7 are diagrams illustrating example processes associated with dynamic repetition and frequency hopping factors for a PUCCH, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with dynamic repetition and frequency hopping factors for a PUCCH.

As shown in FIG. 6, in some aspects, process 600 may include receiving, from a base station, DCI scheduling a PDSCH and indicating a PUCCH repetition factor (block 610). For example, the UE may receive (e.g., using antenna 252, DEMOD 254, MIMO detector 256, receive processor 258, controller/processor 280, memory 282, and/or the like), from a base station, DCI scheduling a PDSCH and indicating a PUCCH repetition factor, as described above.

As further shown in FIG. 6, in some aspects, process 600 may include transmitting, to the base station, a PUCCH that includes HARQ-ACK feedback associated with the PDSCH, wherein one or more instances of the PUCCH are transmitted across one or more uplink slots or sub-slots based at least in part on the PUCCH repetition factor indicated in the DCI (block 620). For example, the UE may transmit (e.g., using controller/processor 280, transmit processor 264, TX MIMO processor 266, MOD 254, antenna 252, memory 282, and/or the like), to the base station, a PUCCH that includes HARQ-ACK feedback associated with the PDSCH, as described above. In some aspects, one or more instances of the PUCCH are transmitted across one or more uplink slots or sub-slots based at least in part on the PUCCH repetition factor indicated in the DCI.

Process 600 may include additional aspects, such as any single aspect or any combination of aspects described below and/or in connection with one or more other processes described elsewhere herein.

In a first aspect, the one or more instances of the PUCCH include one or more repetitions of the PUCCH that are transmitted in different uplink slots or sub-slots based at least in part on the PUCCH repetition factor having a value greater than one.

In a second aspect, alone or in combination with the first aspect, process 600 includes receiving RRC signaling configuring a set of multiple PUCCH repetition factors, and the DCI includes one or more bits to indicate the PUCCH repetition factor among the set of multiple PUCCH repetition factors.

In a third aspect, alone or in combination with one or more of the first and second aspects, the DCI further indicates a PUCCH frequency hopping factor, and the one or more instances of the PUCCH are transmitted in one or more frequencies across the one or more uplink slots or sub-slots based at least in part on the PUCCH frequency hopping factor indicated in the DCI.

In a fourth aspect, alone or in combination with one or more of the first through third aspects, the one or more frequencies include two or more different frequencies in which the one or more instances of the PUCCH are transmitted based at least in part on the PUCCH repetition factor and the PUCCH frequency hopping factor each having a value greater than one.

In a fifth aspect, alone or in combination with one or more of the first through fourth aspects, process 600 includes receiving RRC signaling configuring a set of multiple PUCCH frequency hopping factors, and the DCI includes one or more bits to indicate the PUCCH frequency hopping factor among the set of multiple PUCCH frequency hopping factors.

In a sixth aspect, alone or in combination with one or more of the first through fifth aspects, the DCI includes one or more bits to jointly indicate the PUCCH repetition factor and the PUCCH frequency hopping factor.

In a seventh aspect, alone or in combination with one or more of the first through sixth aspects, transmitting the PUCCH includes determining that one or more instances of another PUCCH that includes HARQ-ACK feedback associated with another PDSCH overlap in time with the PUCCH, and multiplexing a payload of the other PUCCH into the PUCCH transmitted across the one or more uplink slots or sub-slots based at least in part on the PUCCH transmitted across the one or more uplink slots or sub-slots having a higher priority than the other PUCCH.

In an eighth aspect, alone or in combination with one or more of the first through seventh aspects, the PUCCH transmitted across the one or more uplink slots or sub-slots has the higher priority based at least in part on the PUCCH having an earlier transmission time than the other PUCCH.

In a ninth aspect, alone or in combination with one or more of the first through eighth aspects, the PUCCH transmitted across the one or more uplink slots or sub-slots has the higher priority based at least in part on the PUCCH having a larger PUCCH repetition factor than the other PUCCH.

In a tenth aspect, alone or in combination with one or more of the first through ninth aspects, the PUCCH transmitted across the one or more uplink slots or sub-slots has the higher priority based at least in part on the DCI scheduling the PUCCH being received more recently than DCI scheduling the other PUCCH.

In an eleventh aspect, alone or in combination with one or more of the first through tenth aspects, the PUCCH transmitted across the one or more uplink slots or sub-slots has the higher priority based at least in part on the PUCCH having a larger frequency hopping factor than the other PUCCH.

In a twelfth aspect, alone or in combination with one or more of the first through eleventh aspects, the payload of the other PUCCH is multiplexed into the PUCCH transmitted across the one or more uplink slots or sub-slots based at least in part on the UE receiving the DCI scheduling the PDSCH and the UE receiving another DCI scheduling the other PUCCH more than a threshold time prior to the one or more uplink slots or sub-slots in which the PUCCH is transmitted.

In a thirteenth aspect, alone or in combination with one or more of the first through twelfth aspects, the payload of the other PUCCH is multiplexed into the PUCCH transmitted across the one or more uplink slots or sub-slots based at least in part on the UE receiving the PDSCH scheduled by the DCI and the UE receiving the other PDSCH more than a threshold time prior to the one or more uplink slots or sub-slots in which the PUCCH is transmitted.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
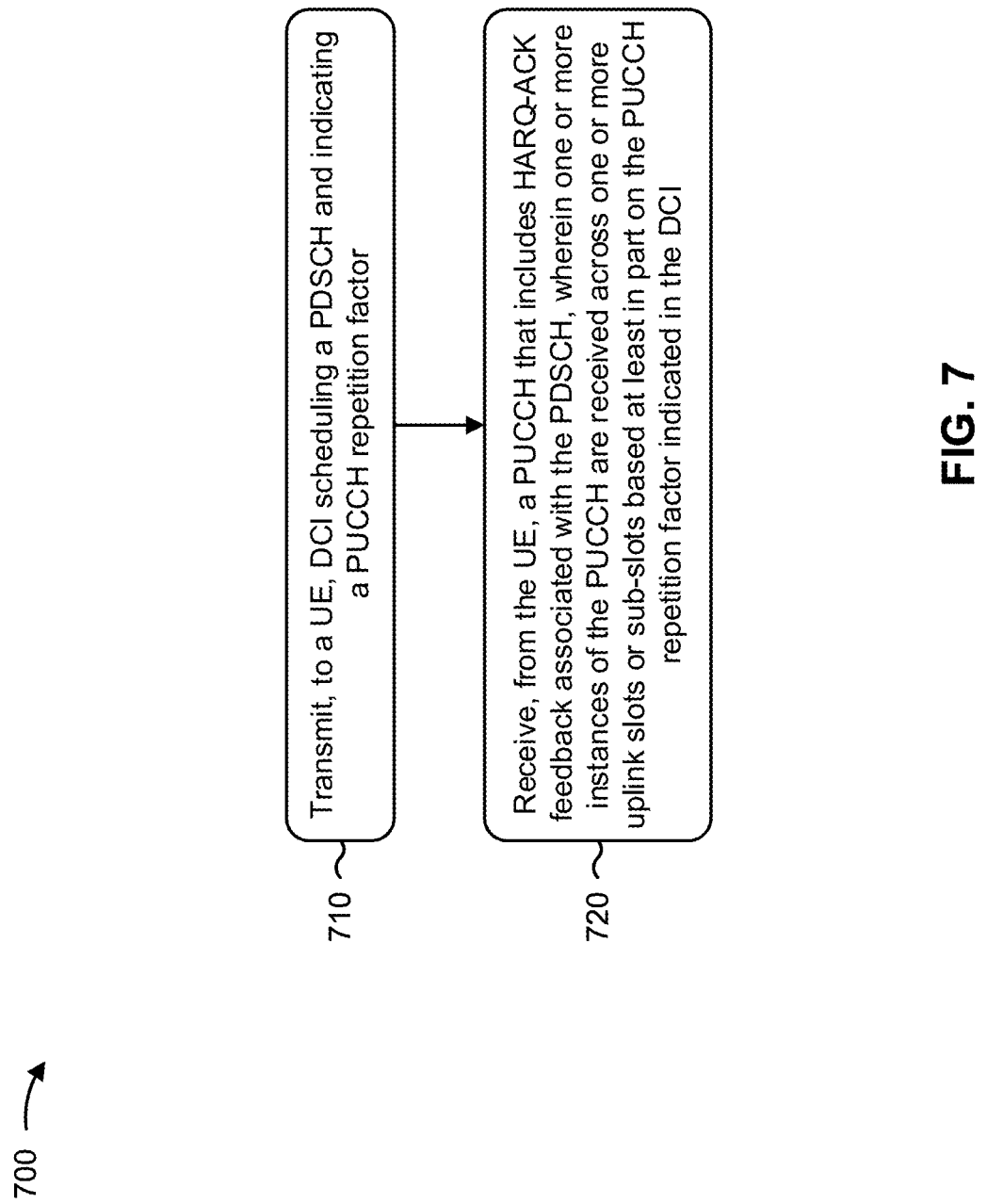

FIG. 7 is a diagram illustrating an example process 700 performed, for example, by a base station, in accordance with the present disclosure. Example process 700 is an example where the base station (e.g., base station 110 and/or the like) performs operations associated with dynamic repetition and frequency hopping factors for a PUCCH.

As shown in FIG. 7, in some aspects, process 700 may include transmitting, to a UE, DCI scheduling a PDSCH and indicating a PUCCH repetition factor (block 710). For example, the base station may transmit (e.g., using controller/processor 240, transmit processor 220, TX MIMO processor 230, MOD 232, antenna 234, memory 242, and/or the like), to a UE, DCI scheduling a PDSCH and indicating a PUCCH repetition factor, as described above.

As further shown in FIG. 7, in some aspects, process 700 may include receiving, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI (block 720). For example, the base station may receive (e.g., using antenna 234, DEMOD 232, MIMO detector 236, receive processor 238, controller/processor 240, memory 242, and/or the like), from the UE, a PUCCH that includes HARQ-ACK feedback associated with the PDSCH. In some aspects, one or more instances of the PUCCH are received across one or more uplink slots or sub-slots based at least in part on the PUCCH repetition factor indicated in the DCI, as described above.

Process 700 may include additional aspects, such as any single aspect or any combination of aspects described below and/or in connection with one or more other processes described elsewhere herein.

In a first aspect, the one or more instances of the PUCCH include one or more repetitions of the PUCCH received in different uplink slots or sub-slots based at least in part on the PUCCH repetition factor having a value greater than one.

In a second aspect, alone or in combination with the first aspect, process 700 includes transmitting RRC signaling configuring a set of multiple PUCCH repetition factors, and the DCI includes one or more bits to indicate the PUCCH repetition factor among the set of multiple PUCCH repetition factors.

In a third aspect, alone or in combination with one or more of the first and second aspects, the DCI further indicates a PUCCH frequency hopping factor, and the one or more instances of the PUCCH are received in one or more frequencies across the one or more uplink slots or sub-slots based at least in part on the PUCCH frequency hopping factor indicated in the DCI.

In a fourth aspect, alone or in combination with one or more of the first through third aspects, the one or more frequencies include two or more different frequencies in which the one or more instances of the PUCCH are received based at least in part on the PUCCH repetition factor and the PUCCH frequency hopping factor each having a value greater than one.

In a fifth aspect, alone or in combination with one or more of the first through fourth aspects, process 700 includes transmitting RRC signaling configuring a set of multiple PUCCH frequency hopping factors, and the DCI includes one or more bits to indicate the PUCCH frequency hopping factor among the set of multiple PUCCH frequency hopping factors.

In a sixth aspect, alone or in combination with one or more of the first through fifth aspects, the DCI includes one or more bits to jointly indicate the PUCCH repetition factor and the PUCCH frequency hopping factor.

In a seventh aspect, alone or in combination with one or more of the first through sixth aspects, the PUCCH includes a multiplexed payload associated with another PUCCH that overlaps in time with the PUCCH received across the one or more uplink slots or sub-slots.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a UE, comprising: receiving, from a base station, DCI scheduling a PDSCH and indicating a PUCCH repetition factor; and transmitting, to the base station, a PUCCH that includes HARQ-ACK feedback associated with the PDSCH, wherein one or more instances of the PUCCH are transmitted across one or more uplink slots or sub-slots based at least in part on the PUCCH repetition factor indicated in the DCI.

Aspect 2: The method of Aspect 1, wherein the one or more instances of the PUCCH include one or more repetitions of the PUCCH that are transmitted in different uplink slots or sub-slots based at least in part on the PUCCH repetition factor having a value greater than one.

Aspect 3: The method of any of Aspects 1-2, further comprising: receiving RRC signaling configuring a set of multiple PUCCH repetition factors, wherein the DCI includes one or more bits to indicate the PUCCH repetition factor among the set of multiple PUCCH repetition factors.

Aspect 4: The method of any of Aspects 1-3, wherein the DCI further indicates a PUCCH frequency hopping factor, and wherein the one or more instances of the PUCCH are transmitted in one or more frequencies across the one or more uplink slots or sub-slots based at least in part on the PUCCH frequency hopping factor indicated in the DCI.

Aspect 5: The method of Aspect 4, wherein the one or more frequencies include two or more different frequencies in which the one or more instances of the PUCCH are transmitted based at least in part on the PUCCH repetition factor and the PUCCH frequency hopping factor each having a value greater than one.

Aspect 6: The method of any of Aspects 4-5, further comprising: receiving RRC signaling configuring a set of multiple PUCCH frequency hopping factors, wherein the DCI includes one or more bits to indicate the PUCCH frequency hopping factor among the set of multiple PUCCH frequency hopping factors.

Aspect 7: The method of any of Aspects 4-6, wherein the DCI includes one or more bits to jointly indicate the PUCCH repetition factor and the PUCCH frequency hopping factor.

Aspect 8: The method of any of Aspects 1-7, wherein transmitting the PUCCH includes: determining that one or more instances of another PUCCH that includes HARQ-ACK feedback associated with another PDSCH overlap in time with the PUCCH; and multiplexing a payload of the other PUCCH into the PUCCH transmitted across the one or more uplink slots or sub-slots based at least in part on the PUCCH transmitted across the one or more uplink slots or sub-slots having a higher priority than the other PUCCH.

Aspect 9: The method of Aspect 8, wherein the PUCCH transmitted across the one or more uplink slots or sub-slots has the higher priority based at least in part on the PUCCH having an earlier transmission time than the other PUCCH.

Aspect 10: The method of any of Aspects 8-9, wherein the PUCCH transmitted across the one or more uplink slots or sub-slots has the higher priority based at least in part on the PUCCH having a larger PUCCH repetition factor than the other PUCCH.

Aspect 11: The method of any of Aspects 8-10, wherein the PUCCH transmitted across the one or more uplink slots or sub-slots has the higher priority based at least in part on the DCI scheduling the PUCCH being received more recently than DCI scheduling the other PUCCH.

Aspect 12: The method of any of Aspects 8-11, wherein the PUCCH transmitted across the one or more uplink slots or sub-slots has the higher priority based at least in part on the PUCCH having a larger frequency hopping factor than the other PUCCH.

Aspect 13: The method of any of Aspects 8-12, wherein the payload of the other PUCCH is multiplexed into the PUCCH transmitted across the one or more uplink slots or sub-slots based at least in part on the UE receiving the DCI scheduling the PDSCH and the UE receiving another DCI scheduling the other PUCCH more than a threshold time prior to the one or more uplink slots or sub-slots in which the PUCCH is transmitted.

Aspect 14: The method of any of Aspects 8-13, wherein the payload of the other PUCCH is multiplexed into the PUCCH transmitted across the one or more uplink slots or sub-slots based at least in part on the UE receiving the PDSCH scheduled by the DCI and the UE receiving the other PDSCH more than a threshold time prior to the one or more uplink slots or sub-slots in which the PUCCH is transmitted.

Aspect 15: A method of wireless communication performed by a base station, comprising: transmitting, to a UE, DCI scheduling a PDSCH and indicating a PUCCH repetition factor; and receiving, from the UE, a PUCCH that includes HARQ-ACK feedback associated with the PDSCH, wherein one or more instances of the PUCCH are received across one or more uplink slots or sub-slots based at least in part on the PUCCH repetition factor indicated in the DCI.

Aspect 16: The method of Aspect 15, wherein the one or more instances of the PUCCH include one or more repetitions of the PUCCH received in different uplink slots or sub-slots based at least in part on the PUCCH repetition factor having a value greater than one.

Aspect 17: The method of any of Aspects 15-16, further comprising: transmitting RRC signaling configuring a set of multiple PUCCH repetition factors, wherein the DCI includes one or more bits to indicate the PUCCH repetition factor among the set of multiple PUCCH repetition factors.

Aspect 18: The method of any of Aspects 15-17, wherein the DCI further indicates a PUCCH frequency hopping factor, and wherein the one or more instances of the PUCCH are received in one or more frequencies across the one or more uplink slots or sub-slots based at least in part on the PUCCH frequency hopping factor indicated in the DCI.

Aspect 19: The method of Aspect 18, wherein the one or more frequencies include two or more different frequencies in which the one or more instances of the PUCCH are received based at least in part on the PUCCH repetition factor and the PUCCH frequency hopping factor each having a value greater than one.

Aspect 20: The method of any of Aspects 18-19, further comprising: transmitting RRC signaling configuring a set of multiple PUCCH frequency hopping factors, wherein the DCI includes one or more bits to indicate the PUCCH frequency hopping factor among the set of multiple PUCCH frequency hopping factors.

Aspect 21: The method of any of Aspects 18-20, wherein the DCI includes one or more bits to jointly indicate the PUCCH repetition factor and the PUCCH frequency hopping factor.

Aspect 22: The method of any of Aspects 15-21, wherein the PUCCH includes a multiplexed payload associated with another PUCCH that overlaps in time with the PUCCH received across the one or more uplink slots or sub-slots.

Aspect 23: An apparatus for wireless communication at a device, comprising a processor; memory coupled with the processor; and instructions stored in the memory and executable by the processor to cause the apparatus to perform the method of one or more of Aspects 1-14.

Aspect 24: A device for wireless communication, comprising a memory and one or more processors coupled to the memory, the one or more processors configured to perform the method of one or more of Aspects 1-14.

Aspect 25: An apparatus for wireless communication, comprising at least one means for performing the method of one or more of Aspects 1-14.

Aspect 26: A non-transitory computer-readable medium storing code for wireless communication, the code comprising instructions executable by a processor to perform the method of one or more of Aspects 1-14.

Aspect 27: A non-transitory computer-readable medium storing a set of instructions for wireless communication, the set of instructions comprising one or more instructions that, when executed by one or more processors of a device, cause the device to perform the method of one or more of Aspects 1-14.

Aspect 28: An apparatus for wireless communication at a device, comprising a processor; memory coupled with the processor; and instructions stored in the memory and executable by the processor to cause the apparatus to perform the method of one or more of Aspects 15-22.

Aspect 29: A device for wireless communication, comprising a memory and one or more processors coupled to the memory, the one or more processors configured to perform the method of one or more of Aspects 15-22.

Aspect 30: An apparatus for wireless communication, comprising at least one means for performing the method of one or more of Aspects 15-22.

Aspect 31: A non-transitory computer-readable medium storing code for wireless communication, the code comprising instructions executable by a processor to perform the method of one or more of Aspects 15-22.

Aspect 32: A non-transitory computer-readable medium storing a set of instructions for wireless communication, the set of instructions comprising one or more instructions that, when executed by one or more processors of a device, cause the device to perform the method of one or more of Aspects 15-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, radio resource control (RRC) signaling configuring a set of multiple physical uplink control channel (PUCCH) repetition factors and a set of multiple PUCCH frequency hopping factors;
   receiving, from the base station, downlink control information (DCI) scheduling a physical downlink shared channel (PDSCH) and indicating PUCCH repetition factor, from among the set of multiple PUCCH repetition factors, and a PUCCH frequency hopping factor, from among the set of multiple PUCCH frequency hopping factors; and
   transmitting, to the base station, a PUCCH that includes hybrid automatic repeat request acknowledgement (HARQ-ACK) feedback associated with the PDSCH, wherein one or more instances of the PUCCH are transmitted across one or more uplink slots or sub-slots based at least in part on the PUCCH repetition factor and the PUCCH frequency hopping factor indicated in the DCI.

2. The method of claim 1, wherein the one or more instances of the PUCCH include one or more repetitions of the PUCCH that are transmitted in different uplink slots or sub-slots based at least in part on the PUCCH repetition factor having a value greater than one.

3. The method of claim 1,
   wherein the DCI includes one or more bits to indicate the PUCCH repetition factor among the set of multiple PUCCH repetition factors.

4. The method of claim 1, wherein the one or more instances of the PUCCH are transmitted in one or more frequencies across the one or more uplink slots or sub-slots based at least in part on the PUCCH frequency hopping factor indicated in the DCI.

5. The method of claim 4, wherein the one or more frequencies include two or more different frequencies in which the one or more instances of the PUCCH are transmitted based at least in part on the PUCCH repetition factor and the PUCCH frequency hopping factor each having a value greater than one.

6. The method of claim 4,
   wherein the DCI includes one or more bits to indicate the PUCCH frequency hopping factor among the set of multiple PUCCH frequency hopping factors.

7. The method of claim 4, wherein the DCI includes one or more bits to jointly indicate the PUCCH repetition factor and the PUCCH frequency hopping factor.

8. The method of claim 1, wherein transmitting the PUCCH includes:
   determining that one or more instances of another PUCCH that includes HARQ-ACK feedback associated with another PDSCH overlap in time with the PUCCH; and
   multiplexing a payload of the other PUCCH into the PUCCH transmitted across the one or more uplink slots or sub-slots based at least in part on the PUCCH transmitted across the one or more uplink slots or sub-slots having a higher priority than the other PUCCH.

9. The method of claim 8, wherein the PUCCH transmitted across the one or more uplink slots or sub-slots has the higher priority based at least in part on the PUCCH having an earlier transmission time than the other PUCCH.

10. The method of claim 8, wherein the PUCCH transmitted across the one or more uplink slots or sub-slots has the higher priority based at least in part on the PUCCH having a larger PUCCH repetition factor than the other PUCCH.

11. The method of claim 8, wherein the PUCCH transmitted across the one or more uplink slots or sub-slots has the higher priority based at least in part on the DCI scheduling the PUCCH being received more recently than DCI scheduling the other PUCCH.

12. The method of claim 8, wherein the PUCCH transmitted across the one or more uplink slots or sub-slots has the higher priority based at least in part on the PUCCH having a larger frequency hopping factor than the other PUCCH.

13. The method of claim 8, wherein the payload of the other PUCCH is multiplexed into the PUCCH transmitted across the one or more uplink slots or sub-slots based at least in part on the UE receiving the DCI scheduling the PDSCH and the UE receiving another DCI scheduling the other PUCCH more than a threshold time prior to the one or more uplink slots or sub-slots in which the PUCCH is transmitted.

14. The method of claim 8, wherein the payload of the other PUCCH is multiplexed into the PUCCH transmitted across the one or more uplink slots or sub-slots based at least in part on the UE receiving the PDSCH scheduled by the DCI and the UE receiving the other PDSCH more than a threshold time prior to the one or more uplink slots or sub-slots in which the PUCCH is transmitted.

15. A method of wireless communication performed by a base station, comprising:
transmitting, to a user equipment (UE), radio resource control (RRC) signaling configuring a set of multiple physical uplink control channel (PUCCH) repetition factors and a set of multiple PUCCH frequency hopping factors;
transmitting, to the UE, downlink control information (DCI) scheduling a physical downlink shared channel (PDSCH) and indicating a PUCCH repetition factor, from among the set of multiple PUCCH repetition factors, and a PUCCH frequency hopping factor, from among the set of multiple PUCCH frequency hopping factors; and
receiving, from the UE, a PUCCH that includes hybrid automatic repeat request acknowledgement (HARQ-ACK) feedback associated with the PDSCH, wherein one or more instances of the PUCCH are received across one or more uplink slots or sub-slots based at least in part on the PUCCH repetition factor and the PUCCH frequency hopping factor indicated in the DCI.

16. The method of claim 15, wherein the one or more instances of the PUCCH include one or more repetitions of the PUCCH received in different uplink slots or sub-slots based at least in part on the PUCCH repetition factor having a value greater than one.

17. The method of claim 15,
wherein the DCI includes one or more bits to indicate the PUCCH repetition factor among the set of multiple PUCCH repetition factors.

18. The method of claim 15, wherein the one or more instances of the PUCCH are received in one or more frequencies across the one or more uplink slots or sub-slots based at least in part on the PUCCH frequency hopping factor indicated in the DCI.

19. The method of claim 18, wherein the one or more frequencies include two or more different frequencies in which the one or more instances of the PUCCH are received based at least in part on the PUCCH repetition factor and the PUCCH frequency hopping factor each having a value greater than one.

20. The method of claim 18,
wherein the DCI includes one or more bits to indicate the PUCCH frequency hopping factor among the set of multiple PUCCH frequency hopping factors.

21. The method of claim 18, wherein the DCI includes one or more bits to jointly indicate the PUCCH repetition factor and the PUCCH frequency hopping factor.

22. The method of claim 15, wherein the PUCCH includes a multiplexed payload associated with another PUCCH that overlaps in time with the PUCCH received across the one or more uplink slots or sub-slots.

23. A user equipment (UE) for wireless communication, comprising:
a memory; and
one or more processors, coupled with the memory, configured to:
receive, from a base station, radio resource control (RRC) signaling configuring a set of multiple physical uplink control channel (PUCCH) repetition factors and a set of multiple PUCCH frequency hopping factors;
receive, from the base station, downlink control information (DCI) scheduling a physical downlink shared channel (PDSCH) and indicating PUCCH repetition factor, from among the set of multiple PUCCH repetition factors, and a PUCCH frequency hopping factor, from among the set of multiple PUCCH frequency hopping factors; and
transmit, to the base station, a PUCCH that includes hybrid automatic repeat request acknowledgement (HARQ-ACK) feedback associated with the PDSCH, wherein one or more instances of the PUCCH are transmitted across one or more uplink slots or sub-slots based at least in part on the PUCCH repetition factor and the PUCCH frequency hopping factor indicated in the DCI.

24. The UE of claim 23, wherein the one or more instances of the PUCCH include one or more repetitions of the PUCCH that are transmitted in different uplink slots or sub-slots based at least in part on the PUCCH repetition factor having a value greater than one.

25. The UE of claim 23,
wherein the DCI includes one or more bits to indicate the PUCCH repetition factor among the set of multiple PUCCH repetition factors.

26. The UE of claim 23, wherein the one or more instances of the PUCCH are transmitted in one or more frequencies across the one or more uplink slots or sub-slots based at least in part on the PUCCH frequency hopping factor indicated in the DCI.

27. The UE of claim 26,
wherein the DCI includes one or more bits to indicate the PUCCH frequency hopping factor among the set of multiple PUCCH frequency hopping factors.

28. The UE of claim 26, wherein the DCI includes one or more bits to jointly indicate the PUCCH repetition factor and the PUCCH frequency hopping factor.

29. The UE of claim 23, wherein the one or more processors, to transmit the PUCCH, are further configured to:
determine that one or more instances of another PUCCH that includes HARQ-ACK feedback associated with another PDSCH overlap in time with the PUCCH; and
multiplex a payload of the other PUCCH into the PUCCH transmitted across the one or more uplink slots or sub-slots based at least in part on the PUCCH transmitted across the one or more uplink slots or sub-slots having a higher priority than the other PUCCH.

30. A base station for wireless communication, comprising:
a memory; and
one or more processors, coupled with the memory, configured to:
transmit, to a user equipment (UE), radio resource control (RRC) signaling configuring a set of multiple physical uplink control channel (PUCCH) repetition factors and a set of multiple PUCCH frequency hopping factors;

transmit, to the UE, downlink control information (DCI) scheduling a physical downlink shared channel (PDSCH) and indicating a PUCCH repetition factor, from among the set of multiple PUCCH repetition factors, and a PUCCH frequency hopping factor, from among the set of multiple PUCCH frequency hopping factors; and receive, from the UE, a PUCCH that includes hybrid automatic repeat request acknowledgement (HARQ-ACK) feedback associated with the PDSCH, wherein one or more instances of the PUCCH are received across one or more uplink slots or sub-slots based at least in part on the PUCCH repetition factor and the PUCCH frequency hopping factor indicated in the DCI.

\* \* \* \* \*